Feb. 23, 1960
L. R. KORTICK
2,926,102
MULTICOLOR SILHOUETTE DRAWING PAPER
Filed Aug. 4, 1958
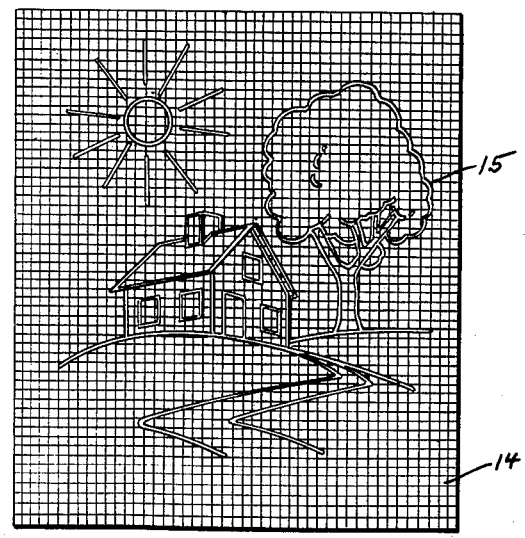
FIG. 1
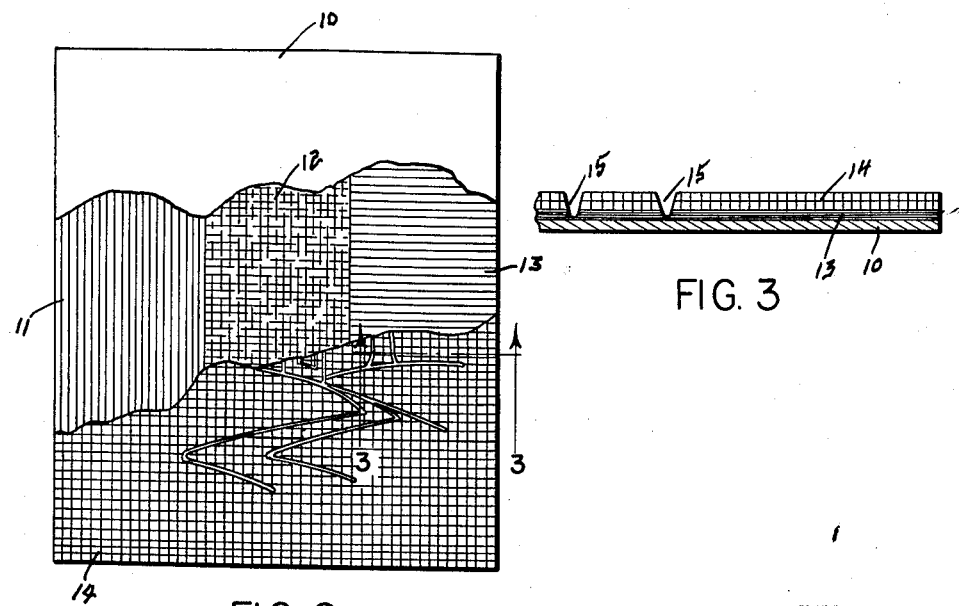
FIG. 2
FIG. 3
INVENTOR.
LEONARD R. KORTICK
BY
ATTORNEY United States Patent Office 2,926,102
Patented Feb. 23, 1960

2,926,102

MULTICOLOR SILHOUETTE DRAWING PAPER

Leonard R. Kortick, Cranston, R.I.

Application August 4, 1958, Serial No. 753,055

1 Claim. (Cl. 117—45)

My present invention relates to a novel construction of a multicolored silhouette drawing paper.

The principal object of the present invention is to provide a prepared drawing paper which permits silhouette drawings in a plurality of colors.

A further object of the present invention is to provide a silhouette drawing paper which can be manufactured and prepared quickly and economically.

Another object of the present invention is to provide a silhouette drawing paper which is easy and economical to use.

With the above and other objects and advantageous features in view, my invention consists of a novel arrangement of parts more fully disclosed in the detailed description following, in conjunction with the accompanying drawings and more particularly defined in the appended claims.

In the drawings,

Fig. 1 is a plan view of a drawing made on a paper embodying my invention.

Fig. 2 is a view similar to Fig. 1 with the various layers broken away.

Fig. 3 is an enlarged section of a portion of the paper taken on line 3—3 on Fig. 2.

Commercial artists occasionally silhouette drawings in which the drawing appears in a white outline against a black background. This is done by taking comparatively expensive white drawing paper and coating it by hand with india ink. The artist then uses a sharp pointed stylus to scratch the drawing on the sheet. The india ink is scratched away exposing the white surface underneath. In schools, a similar result is accomplished by having the students cover a sheet with black crayon. This is a long and tedious operation. The present invention is designed to provide a prepared sheet which can be used either for commercial art or school work and which will eliminate manual preparation of the sheet. Furthermore, the present invention utilizes a plurality of colors which will enhance the finished product.

Referring to Fig. 2, the drawing sheet of the present invention comprises a base sheet 10 which may be of low grade drawing paper in the original white color. The paper 10 is run through a conventional multicolor press to provide the sheet 10 with a surface of one or more colors. For purposes of illustration the sheet 10 is shown imprinted with a red color 11, a yellow color 12 and a blue color 13 in side by side relation. Other colors may be used and less than three colors may also be used. Also, for different effects, the colors may be swirled and intermingled or mottled. The printed sheet 10 is now coated with a layer of wax 14 having an opaque color. In the illustrated form the wax is shown as black. A black carbon pigment is suspended in the wax for this purpose. The sheet is now ready for use and can be made up in pads in various sizes.

To draw on the sheet of the present invention it is not necessary to have an extremely sharp instrument. A match stick or toothpick is sufficient because it is only necessary to remove a line of the surface wax to make the drawing. As shown in Fig. 1, a scene can be painted on a drawing by scratching the lines 15 in the form of grooves which remove the opaque wax to expose the printed background. The bright colors will then become visible at the grooved portions to form a silhouette drawing.

With the prepared sheets of the present invention, a cut-out can be placed over the sheet and traced by a child to form a silhouette. The cut-outs can be in the form of objects or animals. This can also be used for commercial purposes.

The sheet of the present invention is simple and economical to manufacture and effects a considerable saving in the manual preparation of similar sheets. Furthermore, the construction permits the use of a variety of colors easily imprinted on the base sheet. Also, the sheet of the present invention eliminates the need of sharp pointed instruments and makes drawing easier. Other advantages of the present invention will be readily apparent to a person skilled in the art.

I claim:

A silhouette drawing paper comprising a base sheet of light drawing paper, a plurality of colors imprinted on the front of said sheet in an irregular pattern, and a layer of opaque wax covering the imprinted face of said sheet, said wax having a black pigment suspended therein.

References Cited in the file of this patent

UNITED STATES PATENTS

| | | |
|---|---|---|
| 1,783,442 | Mayer | Dec. 2, 1930 |
| 2,135,538 | Sherman | Nov. 8, 1938 |
| 2,313,808 | Dalton | Mar. 16, 1943 |